US008135947B1

(12) United States Patent
Evans et al.

(10) Patent No.: US 8,135,947 B1
(45) Date of Patent: Mar. 13, 2012

(54) INTERCONNECT DEVICE TO ENABLE COMPLIANCE WITH RIGHTS MANAGEMENT RESTRICTIONS

(75) Inventors: Gregory Morgan Evans, Raleigh, NC (US); Cheryl Adams, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1244 days.

(21) Appl. No.: 11/689,059

(22) Filed: Mar. 21, 2007

(51) Int. Cl.
H04L 29/00 (2006.01)
H04L 29/02 (2006.01)

(52) U.S. Cl. .............. 713/153; 726/26; 726/27; 726/28; 726/29; 726/30; 380/201

(58) Field of Classification Search .................. 713/153; 380/201
See application file for complete search history.

(56) References Cited

U.S. PATENT DOCUMENTS

| 5,613,004 | A | 3/1997 | Cooperman et al. |
| 5,687,236 | A | 11/1997 | Moskowitz et al. |
| 6,141,753 | A | 10/2000 | Zhao et al. |
| 6,389,541 | B1 | 5/2002 | Patterson |
| 6,735,699 | B1 | 5/2004 | Sasaki et al. |
| 6,751,670 | B1 | 6/2004 | Patterson |
| 6,804,779 | B1 | 10/2004 | Carroni et al. |
| 6,980,204 | B1 | 12/2005 | Hawkins et al. |
| 6,987,985 | B2 | 1/2006 | Purkayastha et al. |
| 7,003,131 | B2 | 2/2006 | Watson et al. |
| 7,016,668 | B2 | 3/2006 | Vaidyanathan et al. |
| 7,036,024 | B2 | 4/2006 | Watson |
| 7,065,607 | B2 | 6/2006 | England et al. |
| 7,069,580 | B1 * | 6/2006 | Deitz et al. ........................ 726/2 |
| 7,242,766 | B1 * | 7/2007 | Lyle .................................. 380/2 |
| 7,369,677 | B2 | 5/2008 | Petrovic et al. |
| 7,415,617 | B2 * | 8/2008 | Ginter et al. .................. 713/189 |
| 7,562,397 | B1 * | 7/2009 | Mithal et al. .................... 726/33 |

| 2001/0051996 | A1 | 12/2001 | Cooper et al. |
| 2002/0010759 | A1 | 1/2002 | Hitson et al. |
| 2002/0049580 | A1 | 4/2002 | Kutaragi et al. |
| 2002/0054578 | A1 | 5/2002 | Zhang et al. |
| 2002/0061029 | A1 | 5/2002 | Dillon |
| 2002/0104003 | A1 | 8/2002 | Iwamura |
| 2002/0104099 | A1 | 8/2002 | Novak |
| 2002/0122141 | A1 | 9/2002 | Lee |
| 2002/0129367 | A1 | 9/2002 | Devara |
| 2002/0141578 | A1 | 10/2002 | Ripley et al. |
| 2002/0144267 | A1 | 10/2002 | Gutta et al. |
| 2002/0156842 | A1 | 10/2002 | Signes et al. |

(Continued)

FOREIGN PATENT DOCUMENTS

GB 2 306 869 A 5/1997

(Continued)

OTHER PUBLICATIONS

High-bandwidth Digital Content Protection System, Revision 1.3, Dec. 21, 2006.* PureLink Digital Extender, HDC Fiber Optic extension cable, 2006.*
Vijay T. Raisinghani et al., "ECLAIR: An Efficient Cross Layer Architecture for Wireless Protocol Stacks," (article), May 25-28, 2004, 6 pages, 5th World Wireless Congress, San Francisco, CA.
Eric Setton et al., "Cross-Layer Design of Ad Hoc Networks for Real-Time Video Streaming," (article), Aug. 2005, pp. 99-102, vol. 12, issue 4, IEEE Wireless Communications.
No Author, "PC Connection," (website), 2006, 2 pages, http://www.pcconnection.com/ProductDetail?sku=5373172&SourceID=k40132.

(Continued)

*Primary Examiner* — Vivek Srivastava
*Assistant Examiner* — Thomas Lauzon
(74) *Attorney, Agent, or Firm* — Withrow & Terranova, PLLC

(57) ABSTRACT

The present invention provides an interconnect device that connects a source device to a destination device, and allows the source device's non-compliant rights management (RM) interface to deliver media content with little or no restriction to the destination device's compliant RM interface.

26 Claims, 6 Drawing Sheets

U.S. PATENT DOCUMENTS

| | | | |
|---|---|---|---|
| 2002/0168082 A1 | 11/2002 | Razdan | |
| 2003/0009769 A1 | 1/2003 | Hensgen et al. | |
| 2003/0050055 A1 | 3/2003 | Ting et al. | |
| 2003/0081580 A1 | 5/2003 | Vaidyanathan et al. | |
| 2003/0084294 A1 | 5/2003 | Aoshima et al. | |
| 2003/0093665 A1 | 5/2003 | Cooper et al. | |
| 2003/0161268 A1 | 8/2003 | Larsson et al. | |
| 2003/0191850 A1 | 10/2003 | Thornton | |
| 2004/0008864 A1 | 1/2004 | Watson et al. | |
| 2004/0010692 A1 | 1/2004 | Watson | |
| 2004/0010694 A1 | 1/2004 | Collens et al. | |
| 2004/0030798 A1 | 2/2004 | Andersson et al. | |
| 2004/0042421 A1 | 3/2004 | Mahany | |
| 2004/0070593 A1 | 4/2004 | Neely et al. | |
| 2004/0073916 A1 | 4/2004 | Petrovic et al. | |
| 2004/0083487 A1 | 4/2004 | Collens et al. | |
| 2004/0086122 A1 | 5/2004 | Watson | |
| 2004/0088557 A1 | 5/2004 | Malcolm et al. | |
| 2004/0117824 A1 | 6/2004 | Karaoguz et al. | |
| 2004/0139047 A1 | 7/2004 | Rechsteiner et al. | |
| 2004/0156528 A1 | 8/2004 | Joo et al. | |
| 2004/0187005 A1 | 9/2004 | Molaro | |
| 2004/0248615 A1 | 12/2004 | Purkayastha et al. | |
| 2004/0263941 A1 | 12/2004 | Chen et al. | |
| 2004/0264372 A1 | 12/2004 | Huang | |
| 2005/0008017 A1 | 1/2005 | Datta et al. | |
| 2005/0034001 A1 | 2/2005 | Puntarelli | |
| 2005/0050103 A1 | 3/2005 | Kesteloot et al. | |
| 2005/0081042 A1 | 4/2005 | Venkatesan et al. | |
| 2005/0086069 A1 | 4/2005 | Watson et al. | |
| 2005/0097331 A1 | 5/2005 | Majidimehr et al. | |
| 2005/0108769 A1 | 5/2005 | Arnold et al. | |
| 2005/0120127 A1 | 6/2005 | Bradley et al. | |
| 2005/0123135 A1 | 6/2005 | Hunt et al. | |
| 2005/0125405 A1 | 6/2005 | Watson et al. | |
| 2005/0144468 A1* | 6/2005 | Northcutt et al. | 713/189 |
| 2005/0182876 A1* | 8/2005 | Kim et al. | 710/100 |
| 2005/0182989 A1 | 8/2005 | Zarnke et al. | |
| 2005/0183120 A1 | 8/2005 | Jain et al. | |
| 2005/0192987 A1 | 9/2005 | Marsh | |
| 2005/0201726 A1 | 9/2005 | Malcolm et al. | |
| 2005/0216942 A1 | 9/2005 | Barton | |
| 2005/0220321 A1 | 10/2005 | Langelaar | |
| 2005/0239497 A1 | 10/2005 | Bahl et al. | |
| 2005/0251486 A1 | 11/2005 | Nair | |
| 2005/0286438 A1 | 12/2005 | Rajkotia | |
| 2006/0010274 A1 | 1/2006 | Olson | |
| 2006/0015735 A1 | 1/2006 | Kudo et al. | |
| 2006/0048185 A1 | 3/2006 | Alterman | |
| 2006/0048186 A1 | 3/2006 | Alterman | |
| 2006/0050880 A1 | 3/2006 | Taylor et al. | |
| 2006/0053452 A1 | 3/2006 | Lee et al. | |
| 2006/0053472 A1 | 3/2006 | Goto et al. | |
| 2006/0056349 A1 | 3/2006 | Nakatagawa et al. | |
| 2006/0059560 A1 | 3/2006 | Montulli | |
| 2006/0072786 A1 | 4/2006 | Watson et al. | |
| 2006/0075243 A1 | 4/2006 | Lakamp et al. | |
| 2006/0085534 A1 | 4/2006 | Ralston et al. | |
| 2006/0085830 A1 | 4/2006 | Bruck et al. | |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095792 A1 | 5/2006 | Hurtado et al. | |
| 2006/0123235 A1 | 6/2006 | Vanstone | |
| 2006/0126888 A1 | 6/2006 | Talstra et al. | |
| 2006/0127037 A1 | 6/2006 | Van Hoff et al. | |
| 2006/0133644 A1 | 6/2006 | Wells et al. | |
| 2006/0156003 A1 | 7/2006 | Zhang et al. | |
| 2006/0156416 A1* | 7/2006 | Huotari et al. | 726/27 |
| 2006/0158968 A1 | 7/2006 | Vanman et al. | |
| 2006/0161776 A1 | 7/2006 | Van Der Veen et al. | |
| 2006/0173794 A1 | 8/2006 | Sellars et al. | |
| 2006/0174128 A1 | 8/2006 | Yuval | |
| 2006/0193492 A1 | 8/2006 | Kuzmich et al. | |
| 2006/0200416 A1 | 9/2006 | White et al. | |
| 2006/0282676 A1 | 12/2006 | Serret-Avila et al. | |
| 2007/0056046 A1* | 3/2007 | Claudatos et al. | 726/28 |
| 2007/0124474 A1 | 5/2007 | Margulis | |
| 2007/0130585 A1 | 6/2007 | Perret et al. | |
| 2007/0133673 A1 | 6/2007 | Imaizumi | |
| 2007/0269044 A1 | 11/2007 | Bruestle et al. | |
| 2008/0005676 A1* | 1/2008 | Evans et al. | 715/740 |
| 2008/0044087 A1 | 2/2008 | Levy et al. | |
| 2008/0148063 A1 | 6/2008 | Hanko et al. | |
| 2009/0037388 A1 | 2/2009 | Cooper et al. | |
| 2009/0287837 A1 | 11/2009 | Felsher | |
| 2009/0287940 A1* | 11/2009 | Carr | 713/189 |

FOREIGN PATENT DOCUMENTS

| | | | |
|---|---|---|---|
| WO | 2005/045647 A2 | 5/2005 | |
| WO | 2006056099 A2 | 5/2006 | |
| WO | 2006446099 A3 | 5/2006 | |

OTHER PUBLICATIONS

Vineet Srivastava et al., "Cross-Layer Design: A Survey and the Road Ahead," (article), Dec. 2005, pp. 112-119, IEEE Communications Magazine.

E. Koch et al., "Towards Robust and Hidden Image Copyright Labeling," (article), Jun. 20-22, 1995, 4 pages, Proc. of 1995 IEEE Workshop on Nonlinear Signal and Image Processing, Neos Marmaras, Greece.

Jana Dittmann et al., "Robust MPEG Video Watermarking Technologies," (article), 1998, pp. 71-80, International Multimedia Conference archive Proceedings of the sixth ACM international conference on Multimedia table of contents, Bristol, United Kingdom, http://www.ipsi.fraunhofer.de/mobile/publications/fullpapers/ACM/acm_ab.doc.

Jiri Fridrich, "Applications of Data Hiding in Digital Images," (article), Nov. 4-6, 1998, 33 pages, Tutorial for the ISPACS '98 Conference in Melbourne, Australia.

Paul Judge et al., "WHIM: Watermarking Multicast Video with a Hierarchy of Intermediaries," (article), 2002, pp. 699-712, vol. 39, issue 6, Computer Networks: The International Journal of Computer and Telecommunications Networking archive.

Jim Lyle, "HDCP: what it is and how to use it," Apr. 18, 2002, http://www.edn.com/article/ca209091.html?q=&q=HDCP.

MediaMax Axonix Corporation, http://www.axonix.com/mediamax/.

Kaleidescape—Home, http://www.kaleidescape.com.

Get the eye, get Purelink, http://www.dtrovision.com.

Secure KVM over IP: Global-link—Thinklogical, http://www.thinklogical.com/products/globalLink.php.

DVI Extender CAT5, http://www.networktechinc.com/cat5-dvi.html#.

KVM over IP Extender—Logical Solutions, http://www.kvmpro.com/thinklogical-kvm-extnders-dvi-global-link-p-202.html.

KVMPro—KVM Switch, Avocent KVM over IP, http://www.kvmpro.com/dvi-extender-c-38.html.

The DVI CAT5 Extender, (EXT-DVI-CAT5), http://www.kvmpro.com/gefen-kvm-extenders-dvi-the-dvi-cat5-extender-p-214.html.

The DVI 1000 HD (EXT-DVI-1000), http://www.kvmpro.com/gefen-kvm-extenders-dvi-the-dvi-1000-hd-p-213.html.

Remote Access to USB Devices, http://www.networktechinc.com/usb-ip-extender.html.

USB KVM Extender copper CAT5 RJ45, http://www.networktechinc.com/extenders.html.

Global-Link Product Manual Rev. C—Jan. 2005, Logical Solutions, http://www.thinklogical.com/documents/Global-Link_Manual_Rev_C.pdf.

XTENDEX Series ST-05DVI-150, 150 Foot DVI Video Extender Installation and Operation Manual Software Version 1.2, Oct. 4, 2006, http://www.networktechinc.com/pdf/man063.pdf.

XTENDEX HDTV Extender, http://www.networktechinc.com/pdf/cat-hdtv-extend.pdf.

"Gefen HDMI Cat-5 Extreme User Manual," Gefen Inc., 2006.

* cited by examiner

INTERCONNECT DEVICE TO ENABLE COMPLIANCE WITH RIGHTS MANAGEMENT RESTRICTIONS

FIELD OF THE INVENTION

The present invention relates to delivering restricted media content, and in particular to providing an interconnect device that allows a source device to deliver media content to a destination device when the source device does not have a compliant rights management interface.

BACKGROUND OF THE INVENTION

Copyright owners are in a constant battle against piracy of their media content. In the current digital world, high quality copies of digital content can be readily made and distributed without permission by the copyright owners. With the increasing availability of high definition video content and no or low compression audio content, the need to prevent unauthorized copies of audio and video content is greater than ever. In response to these needs, various digital rights management (DRM) techniques have evolved. DRM is a broad term that is used for various techniques used by copyright owners and authorized publishers to control access and restrict use of media content on associated electronic devices.

High-Bandwidth Digital Content Protection (HDCP) is a form of DRM that was developed by Intel Corporation and is widely used to control the delivery of audio and video media content from one electronic device to another. For HDCP, a source device is able to restrict the playback quality of otherwise high definition media content to DVD (Digital Video Disk) quality, or standard definition, when a destination device does not have an HDCP compliant media interface. Two common HDCP compliant media interfaces include the HDCP compliant High Definition Multimedia Interface (HDMI) and the HDCP compliant Digital Video Interface (DVI). When the destination device does have an HDCP compliant media interface, the high definition media content is generally encrypted by the source device and delivered to the destination device in a secure fashion.

For HDCP, the media interfaces of the respective source and destination devices are able to communicate with each other and play pivotal roles to ensure that the media content is protected. The media interface of the source device will authenticate the media interface of the destination device, and the respective media interfaces will exchange any necessary encryption information to facilitate encryption of the media content by the media interface of the source device and decryption of the encrypted media content by the media interface of the destination device. Notably, this functionality is generally provided in the hardware at the media interfaces and not in the higher level control systems of the respective electronic devices. Other DRM techniques, such as the Advanced Access Content System (AACS), operate in a similar fashion.

Unfortunately, many audio and video processing and interface cards, which often provide the actual media interfaces for various types of electronic devices, such as personal computers, DVD players, set-top boxes, digital video recorders, audio processors and receivers, and video processors, do not comply with HDCP or other DRM techniques. The manufacturers of these processing and interface cards often do not want to incorporate DRM techniques due to increased processing overhead, increased complexity, licensing costs, liability, and the like. Even though the control systems of the electronic devices in which the processing and interface cards are located generally have the processing capability to provide the functionality of compliant media interfaces, the use of non-HDCP compliant processing and interface cards results in non-HDCP compliant electronic devices. Further, legacy products may not have interfaces that are compliant with current DRM requirements. As such, users of non-compliant electronic devices are unable to enjoy the higher resolution audio and video that would otherwise be available to them, if the processing and interface cards were HDCP compliant.

Accordingly, there is a need for a technique to allow a source device that does not have a DRM compliant media interface to securely deliver media content to a destination device that does have a DRM compliant media interface without compromising the security of the media content.

SUMMARY OF THE INVENTION

The present invention provides an interconnect device that connects a source device to a destination device, and allows the source device's non-compliant rights management (RM) interface to deliver media content with little or no restriction to the destination device's compliant RM interface. Without the interconnect device, the media content could not be delivered at all or without significant restriction to the compliant RM interface of the destination device. The interconnect device is coupled to the non-compliant RM interface and an alternate communication interface of the source device, as well as to the compliant RM interface of the destination device. In operation, the source device will determine whether media content to be delivered to the destination device is associated with rights management restrictions and deliver a corresponding notification to the interconnect device via the alternate communication interface.

If the media content is associated with rights management, the interconnect device is able to determine whether the destination device has a compliant RM interface. Via the alternate communication interface, the interconnect device may notify the source device of the presence of the compliant RM interface at the destination device. The interconnect device may also interact with the destination device's compliant RM interface to obtain RM encryption information, which is used for encrypting any media content that is associated with rights management prior to being delivered to the compliant RM interface. Assuming the compliant RM interface is available at the destination device, the source device will encrypt the media content using compliance encryption information, which may be different than the RM encryption information, and deliver the encrypted media content to the interconnect device via the source device's non-compliant RM interface.

The interconnect device may have previously obtained the compliance encryption information via the alternate communication interface of the source device or from another entity. Upon receiving the encrypted media content, the interconnect device will decrypt the encrypted media content using the compliance encryption information. Since the media content must be encrypted using RM encryption information before being delivered to the destination device's RM compliant media interface, the interconnect device will re-encrypt the media content using the RM encryption information. The re-encrypted media content is then delivered to the RM compliant interface of the destination device. As such, media content associated with digital or other rights management may be provided from a non-compliant RM interface at a source device to a compliant RM interface at a destination device in a substantially unrestricted and secure fashion.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
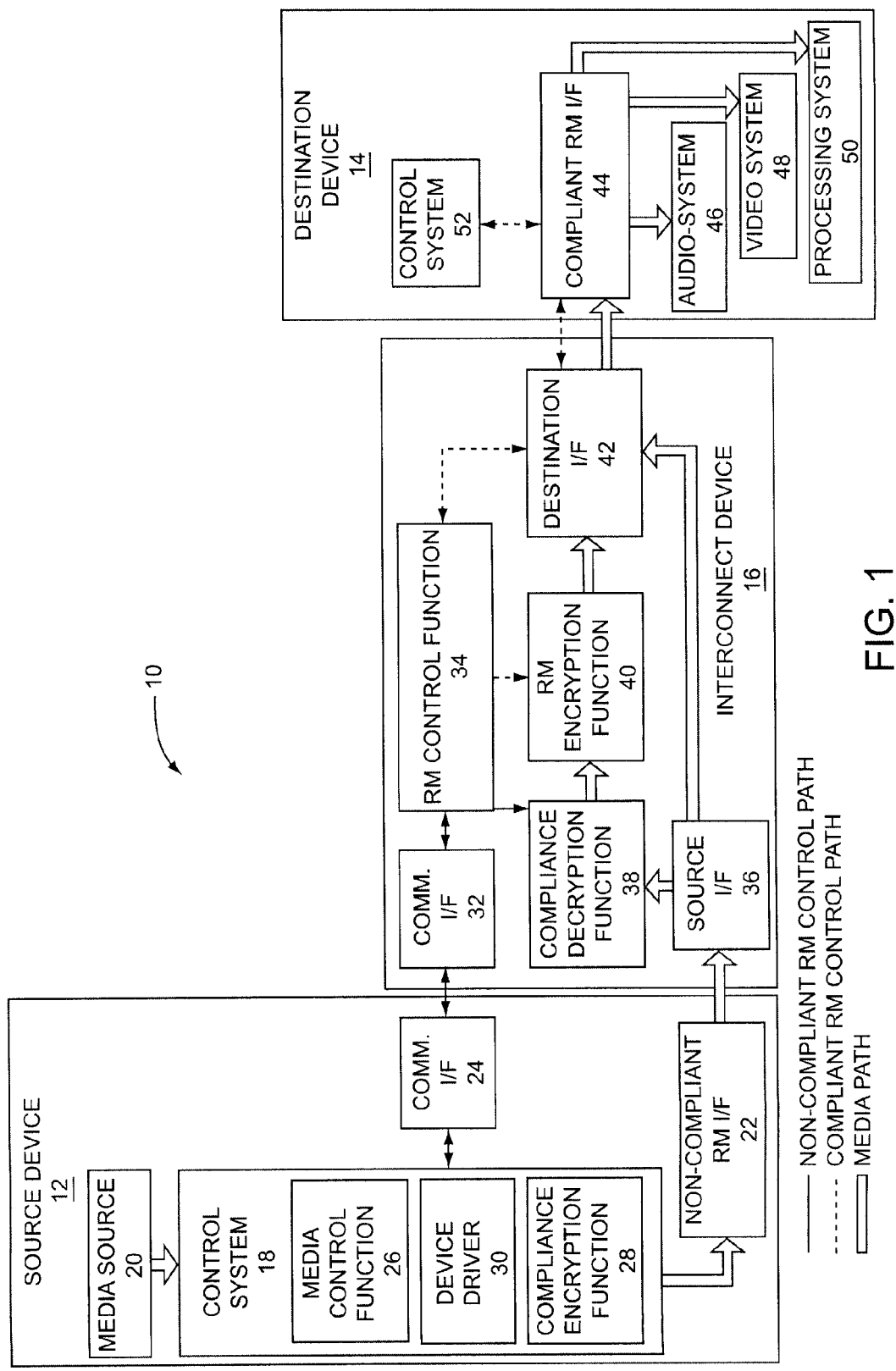
FIG. 1 is a block representation of a media environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an interconnect device that connects a source device to a destination device and allows the source device's non-compliant rights management (RM) interface to deliver media content with little or no restriction to the destination device's compliant RM interface. Without the interconnect device, the media content could not be delivered at all or without significant restriction to the compliant RM interface of the destination device. Prior to delving into the operation details of the interconnect device, an overview of the interaction and basic architecture of a source device, interconnect device, and destination device are provided according to one embodiment of the present invention in FIG. 1.

As illustrated, a source device 12 is coupled to a destination device 14 by an interconnect device 16. The source device 12 may take the form of a personal computer, DVD player, set-top box, digital video recorder, audio processor or receiver, video processor, or the like. The source device 12 has a control system 18 that is associated with a media source 20, a non-compliant RM interface (I/F) 22, and a communication interface 24. The media source 20 is the receiver or storage mechanism from which media content is obtained for delivery by the source device 12. The communication interface 24 is any type of communication interface, such as a personal area network (PAN) interface, local area network (LAN) interface, wireless LAN (WLAN) interface, or wide area network (WAN) interface. In general, the communication interface 24 is an alternate interface to the non-compliant RM interface 22, and is used to allow the source device 12 and the interconnect device 16 to communicate with each other to facilitate certain aspects of the present invention, which will be described below in further detail.

The non-compliant RM interface 22 is primarily a digital media interface from which media content is presented by the source device 12. The non-compliant RM interface 22 may be a digital visual interface (DVI), high-definition multimedia interface (HDMI), or the like. For the present invention, the non-compliant RM interface 22 is not compliant with a desired rights management mechanism that is used to detect the media content as it is delivered from the source device 12 to the destination device 14. Normally, the non-compliant RM interface 22 would not allow certain media content to be delivered to the destination device 14, or would impose significant quality-related restrictions on any media content being delivered to the destination device 14 due to the inability to comply with the rights management associated with the media content. The interconnect device 16 is able to cooperate with the source device 12 to allow the media content to be delivered from the source device 12 to the interconnect device 16 with little or no restriction, and then present the media content to the destination device 14 according to the rights management required for delivering the media content from one device to another.

The control system 18 of the source device 12 will provide or be associated with a media control function 26, a compliance encryption function 28, and a device driver 30. In general, the media control function 26 operates to control delivery and playback of the media content provided by the media source 20. The compliance encryption function 28 is employed to encrypt the media content in a secure fashion, such that the encrypted media content can be safely and securely delivered to the interconnect device 16 via the non-compliant RM interface 22 of the source device 12. The device driver 30 is configured to communicate with the interconnect device 16 through the communication interface 24 to allow the source device 12 and the interconnect device 16 to coordinate with each other in a manner allowing the media content to be encrypted by the source device 12 and decrypted at the interconnect device 16.

The interconnect device 16 will have a communication interface 32, which is coupled to the communication interface 24 of the source device 12. Through the communication interface 32, an RM control function 34 of the interconnect device 16 can effectively communicate with the device driver 30 of the source device 12. The RM control function 34 effectively coordinates operation of the interconnect device 16 with both the source device 12 and the destination device 14. In general, the RM control function 34 of the interconnect device 16 and the device driver 30 of the source device 12 will coordinate with one another to ensure that the media content is encrypted by the source device 12 in a fashion to enable decryption of the encrypted media content by the interconnect device 16. The exchange of this encryption related information, referred to hereinafter as "compliance encryption information," is necessary to facilitate encryption and decryption of the media content. The compliance encryption information is provided or exchanged through the communication interfaces 24, 32 of the source and interconnect devices 12, 16, respectively, and not through the non-compliant RM interface 22 of the source device 12.

When the media control function 26 cooperates with the media source 20 to have media content delivered toward the destination device 14, the media content may be encrypted based on the compliance encryption information by the compliance encryption function 28, wherein the encrypted media content is output through the non-compliant RM interface 22 to a source interface 36 of the interconnect device 16. The encrypted media content is passed through a compliance decryption function 38 to provide the unencrypted media content, which is subsequently re-encrypted by an RM encryption function 40 using RM encryption information. The RM encrypted media content is then passed through a destination interface 42 to a compliant RM interface 44 of the destination device 14. Notably, the media content is encrypted according to the appropriate rights management requirements when delivered from the interconnect device 16 to the compliant RM interface 44 of the destination device 14. Assuming the encrypted media content is decrypted based on the RM encryption information in the compliant RM interface 44, the unencrypted media content may be delivered to any number of sub-systems, such as an audio system 46, video system 48, processing system 50, or the like, depending on the type of media represented by the media content and the type of functionality provided by the destination device 14. Notably, all of the sub-systems as well as the compliant RM interface 44 may be under the control of a control system 52.

The destination device 14 may be the final destination of the media content before being presented to a user, or the destination device 14 may represent an intermediate node, which may act as a source device for delivering the media content to yet another destination device 14. As such, the destination device 14 may take various forms, such as a digital video recorder, set-top box, media server, television, display, or video monitor.

If the media content provided by the source device 12 is not subject to rights management, the compliance encryption function 28 may be bypassed, wherein the media content is delivered from the non-compliant RM interface 22 of the source device 12 to the source interface 36 of the interconnect device 16. At this point, the source interface 36 may deliver the media content to the destination interface 42, directly or through an intermediate processing function (not shown), wherein the unencrypted media content may be delivered to the compliant RM interface 44 and then processed accordingly.

Continuing with FIG. 1, the solid lines between blocks represent non-compliant RM control paths, wherein communication or control information is passed between the respective blocks. This information is generally outside of the rights management mechanism normally required to deliver media content to a compliant RM interface 44 of the destination device 14. The dashed lines represent compliant RM control paths. The information carried along the compliant RM control paths represents control or communication information that is exchanged between the compliant RM interface 44 and the destination interface 42 and RM control function 34 of the interconnect device 16. This information is used to emulate a compliant RM interface of a source device, such that media content may be delivered in an appropriate fashion to the compliant RM interface 44 of the destination device 14. Possible media paths are illustrated by the double-lined media path. Details of the interaction between the interconnect device 16 and the source device 12 and destination device 14 are illustrated further below.

Figure 2A:
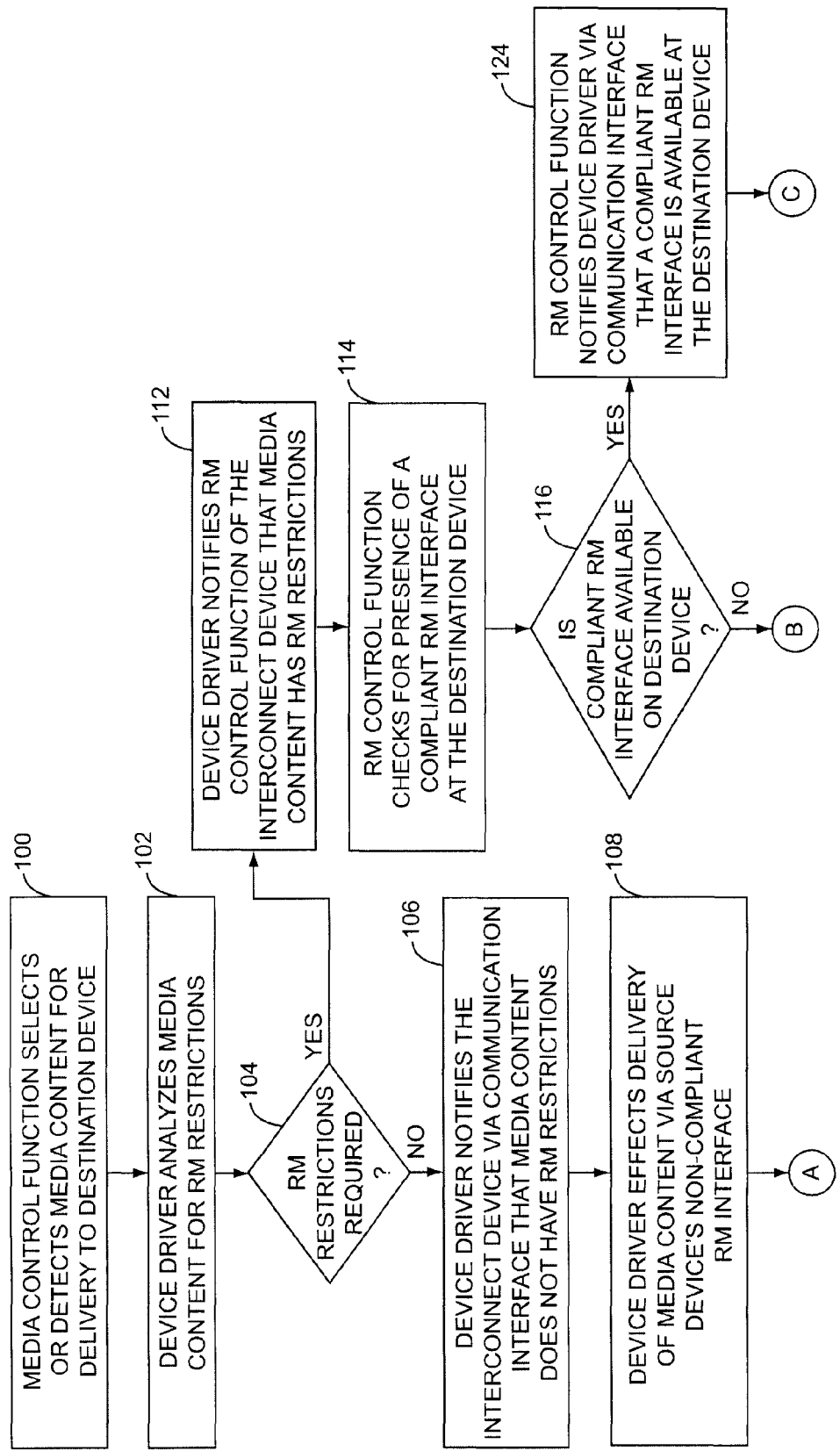
FIGS. 2A-2C are a flow diagram illustrating operation of one embodiment of the present invention.
Figure 2B:
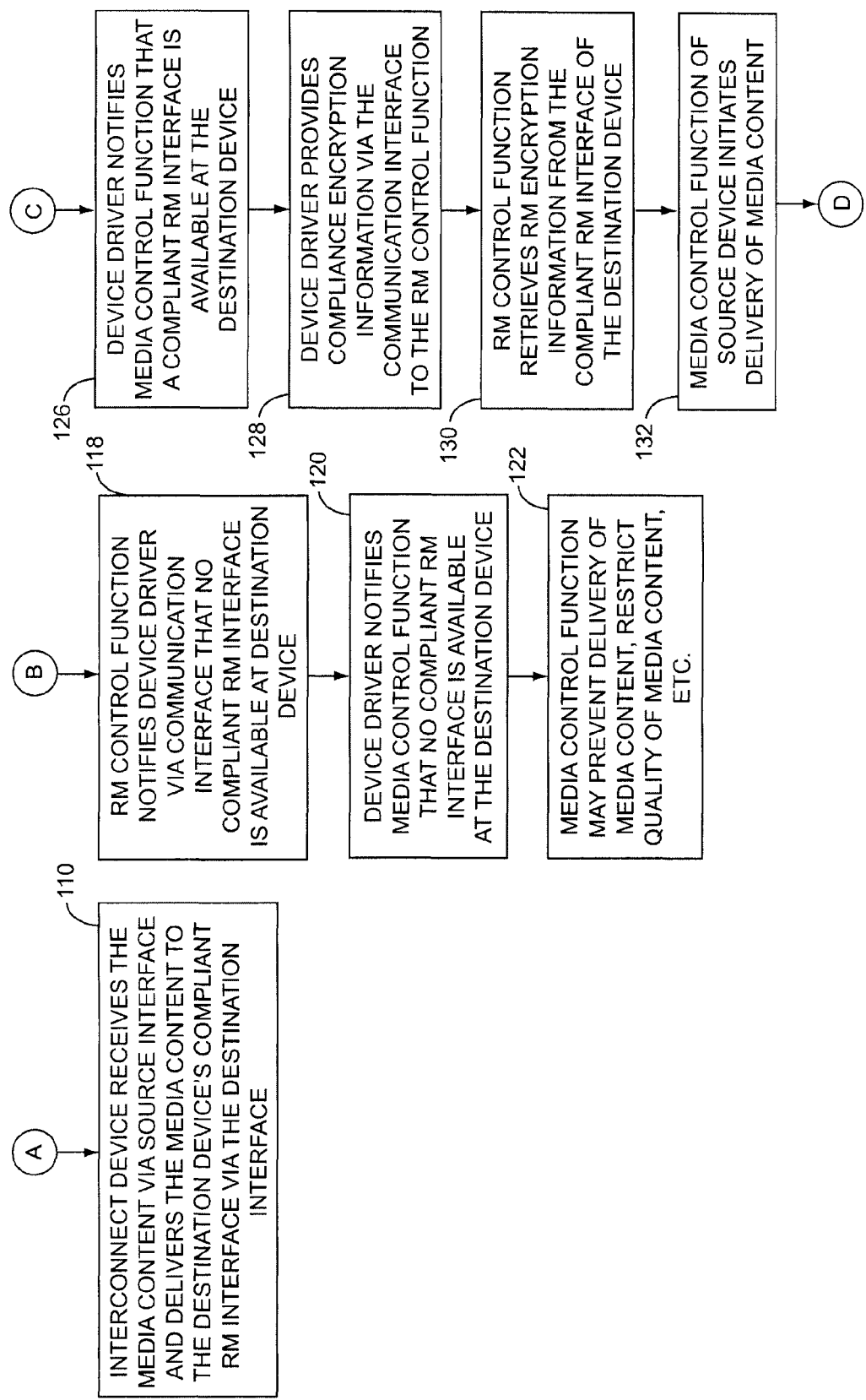
Figure 2C:
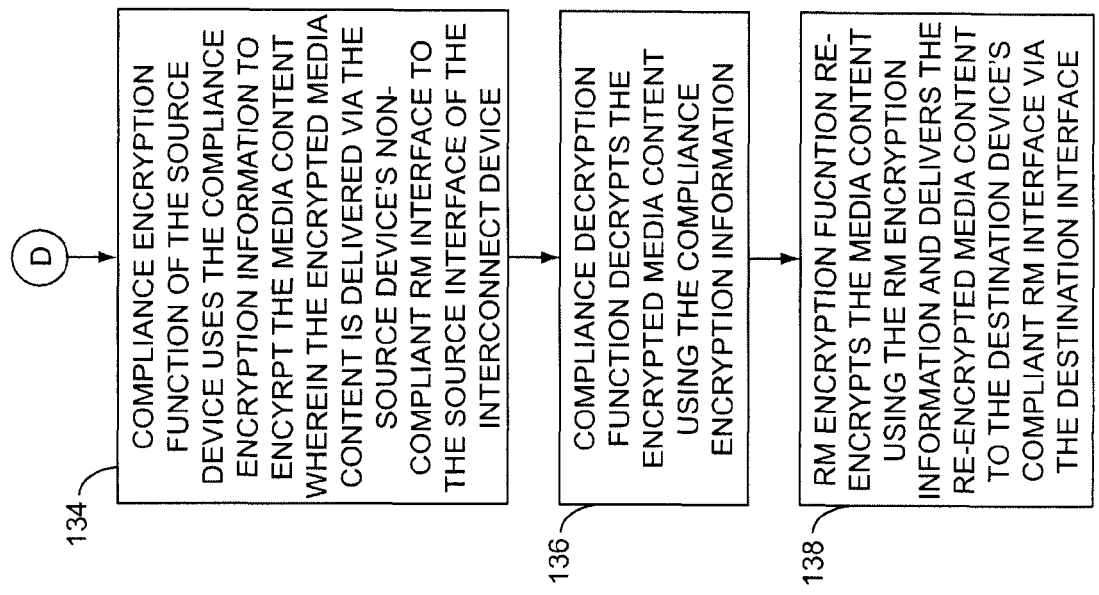

Turning now to FIGS. 2A-2C, a flow diagram is provided to illustrate operation of the source device 12, interconnect device 16, and destination device 14 according to one embodiment of the present invention. Initially, the media control function 26 will select or detect media content for delivery to the destination device 14 (step 100). The device driver 30 of the source device 12 will analyze the media content to identify any associated RM restrictions (step 102). If there are no RM restrictions associated with delivering the media content (step 104), the device driver 30 will notify the interconnect device 16 via the communication interface 24 that the media content does not have RM restrictions (step 106). The device driver 30 will then cooperate with the media control function 26 to effect delivery of the media content via the source device's non-compliant RM interface 22 without restriction, and thus without encrypting the media content using the compliance encryption function 28 (step 108).

The interconnect device 16 will receive the media content via the source interface 36, and deliver the media content to the destination device's compliant RM interface 44 via the destination interface 42 (step 110). The destination device 14 can then process the media content as desired. Notably, media content that is not associated with rights management restrictions may not be encrypted for transmission, and thus the compliant RM interface 44 will not need to decrypt the media content prior to initiating any requisite processing of the media content.

If the device driver 30 analyzes the media content and determines that there are rights management restrictions associated with the media content (step 104), the device driver 30 will notify the RM control function 34 of the interconnect device 16 that the media content has associated rights management restrictions (step 112). If it has not already done so, the RM control function 34 will determine the presence of a compliant RM interface 44 at the destination device 14 via the destination interface 42 (step 114). In operation, the destination interface 42 may interrogate the compliant RM interface 44 to determine its compliance with the requisite rights management requirements, and then report back to the RM control function 34. Alternatively, the RM control function 34 may interact with the compliant RM interface 44 via the destination interface 42 to determine the compliance of the compliant RM interface 44 with the requisite rights management requirements. If there is no compliant rights management interface at the destination device 14 (step 116), the rights management control function 34 will notify the device driver 30 via the communication interfaces 24, 32 that there is no compliant RM interface available at the destination device 14 (step 118). The device driver 30 will notify the media control function 26 that no compliant RM interface is available at the destination device 14 (step 120).

In response, the media control function 26 may take various actions, including preventing delivery of the media content, restricting the quality of the media content that is delivered, and the like (step 122). If the media content may be delivered to the destination device 14 at a restricted quality level, the media control function 26 may operate to downconvert the media content to a lower resolution, re-encode the media content at a higher compression rate, or the like, and then facilitate delivery of the media content to the interconnect device 16 via the non-compliant RM interface 22. The interconnect device 16 will treat the incoming media content as media content that is not associated with rights management, and effect delivery of the poorer quality media content to the compliant RM interface 44 of the destination device 14.

If the media content is associated with rights management restrictions, and the destination device 14 has a compliant RM interface 44 (step 116), the RM control function 34 will notify the device driver 30 via the communication interfaces 24, 32 that a compliant RM interface 44 is available at the destination device 14 (step 124). The device driver 30 will notify the media control function 26 that a compliant RM interface 44 is available at the destination device 14 (step 126). The device driver 30 will also provide compliance encryption information via the communication interfaces 24, 32 to the RM control function 34 of the interconnect device 16 (step 128). Notably, the compliance encryption information is information sufficient to allow the RM control function 34 to instruct the compliance decryption function 38 to decrypt any encrypted media content to be delivered to the interconnect device 16 by the source device 12.

To ensure that the media content is delivered to the destination device 14 according to the rights management requirements, the RM control function 34 may receive rights management encryption information from the compliant RM interface 44 of the destination device 14 via the destination interface 42 (step 130). At this point, the RM control function 34 has compliance encryption information to assist with decrypting encrypted media content provided by the source device 12, and RM encryption information to assist in re-encrypting the unencrypted media content prior to delivering it to the compliant RM interface 44 of the destination device 14.

The media control function 26 of the source device 12 will initiate delivery of the media content (step 132), and as such, the media source 20 will begin delivery of the media content. The compliance encryption function 28 of the source device 12 uses the compliance encryption information to encrypt the media content. The encrypted media content is delivered via the non-compliant RM interface 22 of the source device 12 to the source interface 36 of the interconnect device 16 (step 134). The encrypted media content from the source device 12 is passed through the compliance decryption function 38, which will decrypt the encrypted media content using the compliance encryption information (step 136). Based on the RM control function 34, the unencrypted media content from the compliance decryption function 38 is re-encryption by the RM encryption function 40 using the RM encryption information, and the re-encrypted media content is then delivered through the destination interface 42 of the interconnect device 16 to the compliant RM interface 44 of the destination device 14 (step 138).

At this point, the compliant RM interface 44 may decrypt the re-encrypted media content and deliver the unencrypted media content to the appropriate sub-system for further processing, presentation, or display (step not shown). As indicated above, the destination device 14 may be an intermediate device that acts as a destination device when receiving media content from a source device 12, and then acts as a source device for sending the media information to another destination device.

In one embodiment, the rights management mechanism is an HDCP, AACS, or like digital rights management system. Accordingly, the compliant RM interface 44 and the destination interface 42 may be a DVI or HDMI. Those skilled in the art will recognize other types of digital media interfaces that will benefit from the present invention. In a digital rights management embodiment, the compliant RM interface 44 may be an HDCP-compliant media interface, and the interconnect device 16 may cooperate with the source device 12 via the communication interface 24 and the non-compliant RM interface 22 to allow the media content to be delivered to the destination device 14 with little or no restrictions. By allowing the RM control function 34 of the interconnect device 16 to communicate with the device driver 30 of the source device 12 via a communication interface 24 other than the non-compliant RM interface 22, the source device 12 and the interconnect device 16 can cooperate to securely transfer the media content to the interconnect device 16, which will process the media content as necessary to subsequently provide the media content in an appropriate fashion to the compliant RM interface 44. As such, the destination device 14 does not need to be aware of the presence of the interconnect device 16 or the functionality provided by the interconnect device 16.

Figure 3:
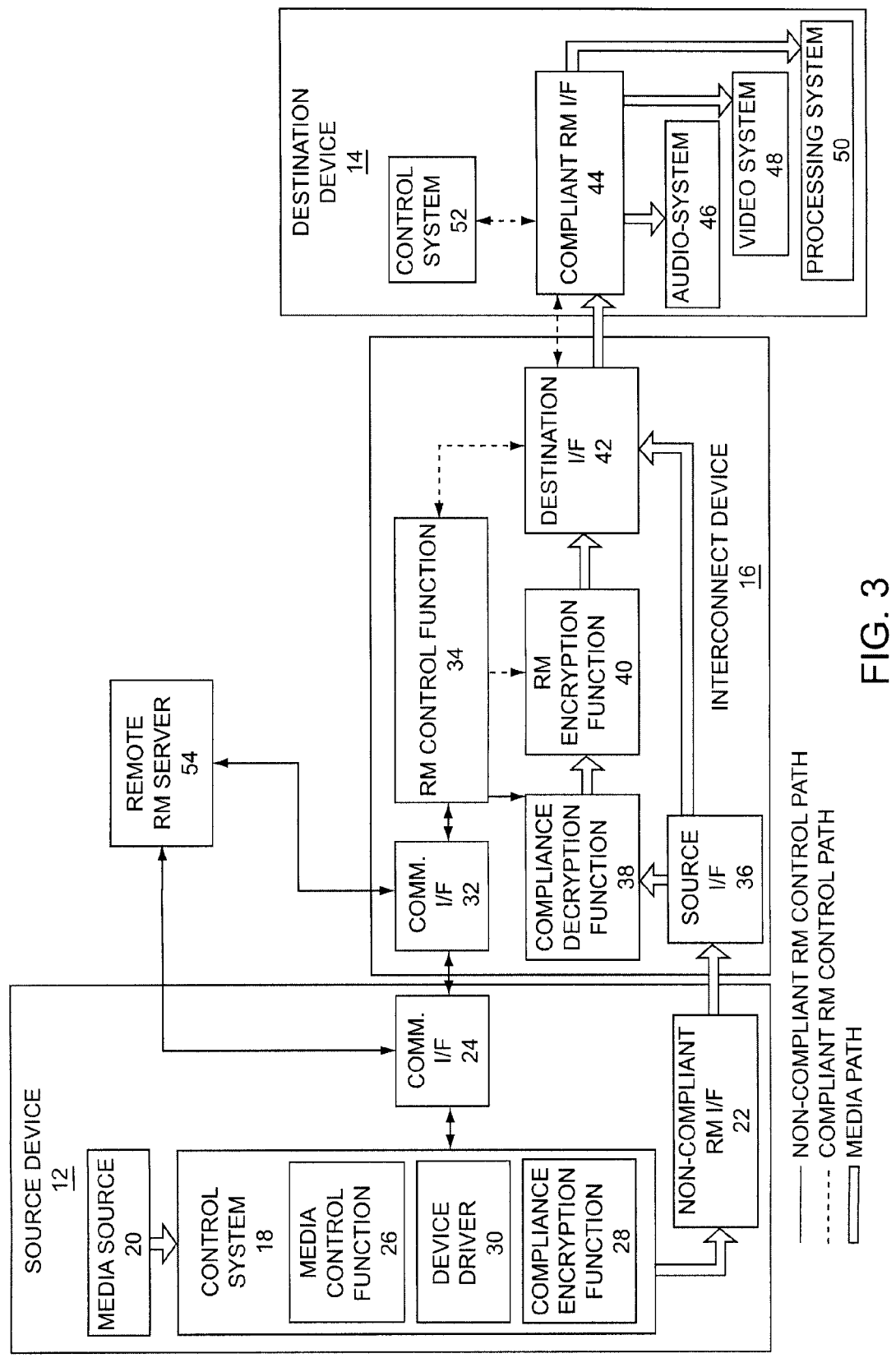
FIG. 3 is a block representation of a media environment according to a second embodiment of the present invention.

However, the source device 12 and the interconnect device 16 must coordinate with each other or be coordinated by another device, such as a remote RM server 54 as illustrated in FIG. 3. For the embodiment shown in FIG. 3, the remote RM server 54 may provide the compliance encryption information to both the source device 12 and the interconnect device 16 through the respective communication interfaces 24, 32. If the source device 12 and the interconnect device 16 cannot communicate with each other, communications may be directed through the remote RM server 54. Alternatively, the remote RM server 54 may simply communicate with each of the source device 12 and the interconnect device 16 to coordinate the functionality described above. For instance, the RM control function 34 may determine that the destination device 14 has a compliant RM interface 44, and then provide this information to the remote RM server 54. The remote RM server 54 may then provide this information to the source device 12 via the communication interface 24, as well as provide or facilitate the exchange of compliance encryption information with the source device 12 and the interconnect device 16.

Regardless of the embodiment, a source device 12 that has a non-compliant RM interface 22 and an alternate communication interface 24 may coordinate with the interconnect device 16 to effectively and securely deliver the media content to the interconnect device 16, which will take the necessary steps to interact with the destination device 14 to deliver the media content in an appropriate fashion to a compliant RM interface 44. Thus, a non-HDCP-compliant source device 12 may take advantage of the interconnect device 16 to be able to deliver full resolution media content at its highest quality to an HDCP-compliant RM interface 44, without risking the integrity of the media content.

Further, the encryption and decryption provided by the source device 12, interconnect device 16, and destination device 14 may take various forms and will include traditional encryption and decryption using appropriate keys and algorithms, and may be provided in a full or limited fashion. Further, such encryption will include frequency-based distortion as well as time-based distortion of audio and video content. Thus, the encryption or decryption associated with the present invention includes but is not limited to full encryption of audio and video content, limited encryption of all or a portion of audio or video content, frequency-based distortion of all or part of audio or video content, and time-based distortion of all or part of audio or video content. Aspects of the present invention may be extended to media content other than audio or video content, such as digital images, data, and the like.

In one embodiment of the present invention, the interconnect device 16 is provided in the form of a cable that is used to connect a source device 12 to a destination device 14. The electronics necessary to provide the various interfaces and functions may have a separate power supply, or power may be derived from the non-compliant RM interface 22 of the source device 12 or from the compliant RM interface 44 of the destination device 14.

Figure 4:
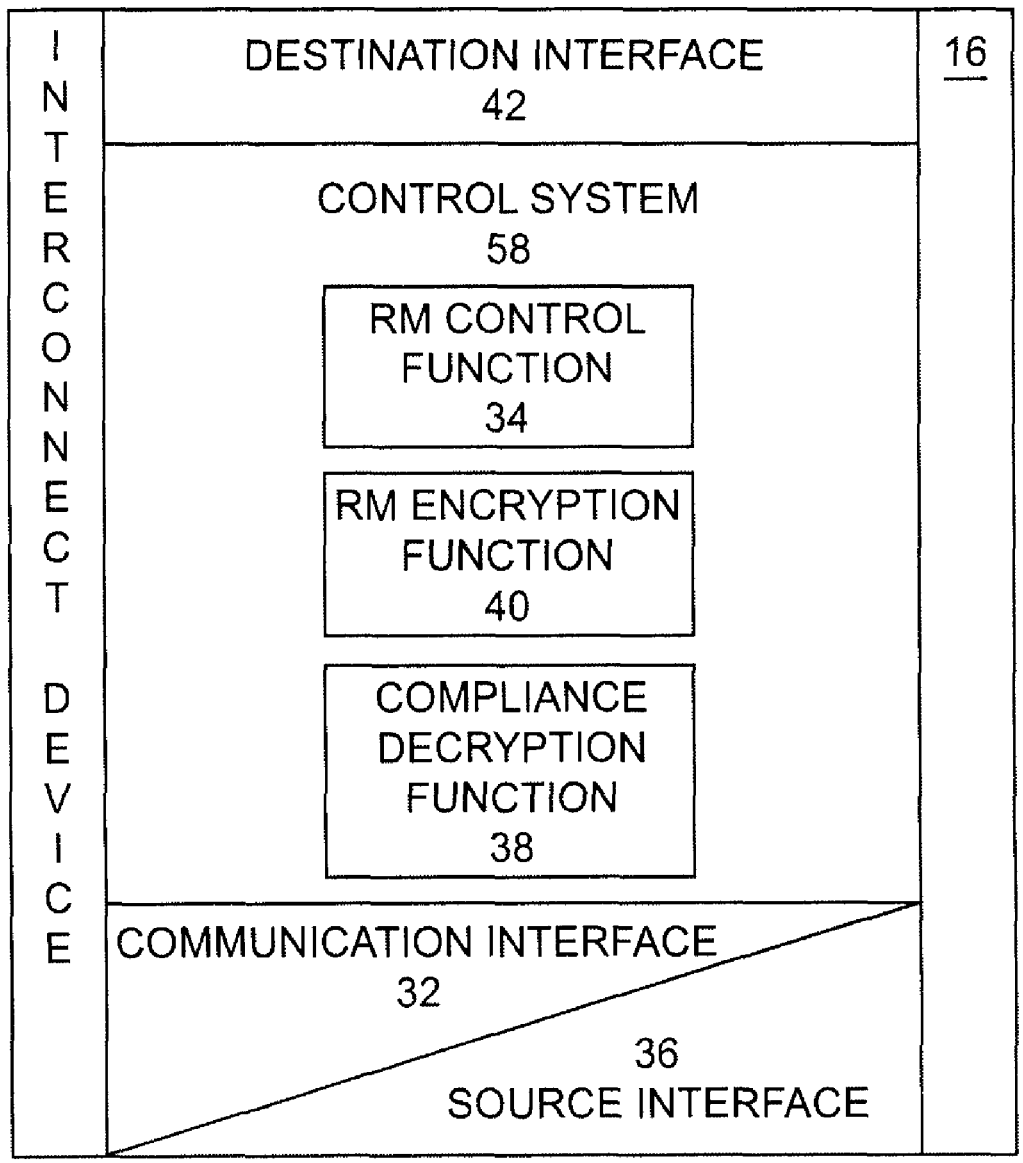
FIG. 4 is a block representation of an interconnect device 16 according to one embodiment of the present invention.

With reference to FIG. 4, a block representation of an interconnect device 16 according to one embodiment of the present invention is illustrated. The interconnect device 16 will include a control system 58, which supports the RM control function 34, the RM encryption function 40, and the compliance decryption function 38, as described above. Further, the control system 58 is associated with the destination interface 42, which is configured to connect to a compliant RM interface 44 of the destination device 14 through an appropriate cable. Similarly, the control system 58 is associated with the source interface 36, which is configured to connect to a non-compliant RM interface 22 of a source device 12 through an appropriate cable. Notably, the destination interface 42 and the source interface 36 may provide a wireless interface to the respective destination and source devices 14, 12. The communication interface 32 is also associated with the control system 58, and may provide a basic communication interface using wired or wireless mechanisms to communicate directly or indirectly with the communication interface 24 of the source device 12, the remote RM server 54, or both.

Those skilled in the art will recognize improvements and modifications to the preferred embodiments of the present invention. All such improvements and modifications are considered within the scope of the concepts disclosed herein and the claims that follow.

What is claimed is:

1. An interconnect for connecting a source device to a destination device to facilitate delivery of media content that is associated with a rights management restriction, comprising:

a first communication interface for communicatively coupling the interconnect to a communication interface of the source device;

a source media interface for a direct wired connection to a non-compliant rights management media interface of the source device;

a destination media interface for a direct wired connection from the interconnect to a media interface of the destination device; and a control system associated with the first communication interface, the source media interface, and the destination media interface and adapted to:

receive from the source device via the, first communication interface first information indicating first media content to be delivered from the source device to the destination device is associated with the rights management restriction;

in response to receiving the first information from the source device indicating that the first media content to be delivered from the source device to the destination device is associated with the rights management restriction, determine whether the media interface of the destination device is compliant with the rights management restriction associated with the first media content; and if the media interface of the destination device is determined to be compliant with the rights management restriction associated with the first media content:

send to the source device via the first communication interface second information indicating that the media interface of the destination device is compliant with the rights management restriction associated with the first media content; and in response to sending the second information to the source device:

receive from the source device via the source media interface encrypted media content, which is the first media content encrypted based on compliance encryption information;

decrypt the encrypted media content to provide unencrypted media content;

encrypt the unencrypted media content based on rights management encryption information associated with the media interface of the destination device to provide re-encrypted media content; and deliver the re-encrypted media content to the media interface of the destination device via the destination media interface.

2. The interconnect of claim 1 wherein the control system is further adapted to retrieve the compliance encryption information directly from the source device via the first communication interface.

3. The interconnect of claim 1 wherein the control system is further adapted to send the compliance encryption information for use by the source device via the first communication interface.

4. The interconnect of claim 1 wherein the re-encrypted media content is not delivered to the media interface of the destination device if the media interface of the destination device is not compliant with the rights management restriction.

5. The interconnect of claim 1 wherein the control system communicates with the media interface of the destination device via the destination media interface to determine whether the media interface of the destination device is compliant with the rights management restriction.

6. The interconnect claim of 1 wherein the media interface of the destination device and the destination media interface are at least one of a group consisting of a high-definition multimedia interface and a digital visual interface.

7. The interconnect of claim 1 wherein the rights management restriction is at least one restriction of a digital rights management protocol.

8. The interconnect of claim 7 wherein the digital rights management protocol is at least one of high-bandwidth digital content protection protocol and advanced access content system protocol.

9. The interconnect of claim 1 wherein the interconnect is implemented as a cable that directly couples the non-compliant rights management media interface of the source device and the media interface of the destination device.

10. The interconnect of claim 1 wherein, if the media interface of the destination device is determined to be non-compliant with the rights management restriction associated with the first media content, the control system is adapted to:

send to the source device via the first communication interface third information indicating that the media interface of the destination device is non-compliant with the rights management restriction associated with the first media content; and in response to sending the third information to the source device:

receive from the source device via the source media interface a reduced quality version of the first media content; and deliver the reduced quality version of the first media content to the media interface of the destination device via the destination media interface.

11. A source device comprising:

a first hardware communication interface for connecting to a communication interface of an interconnect that couples the source device to a destination device;

a non-compliant rights management media interface for a direct wired connection to a media interface of the interconnect; and a control system associated with the first communication interface and the non-compliant rights management media interface and adapted to:

determine whether media content to be delivered to the destination device is associated with a rights management restriction;

send via the first communication interface a first message indicating whether the media content is associated with a rights management restriction;

receive via the first communication interface a second message indicating whether the destination device has a compliant rights management media interface;

when the media content is associated with the rights management restriction and the destination device has a compliant rights management media interface, encrypt the media content based on compliance encryption information to generate encrypted media content; and deliver the encrypted media content via the non-compliant rights management media interface to the interconnect.

12. The source device of claim 11 wherein the interconnect is adapted to decrypt the encrypted media content to obtain decrypted media content, re-encrypt the decrypted media content based on rights management encryption information to provide re-encrypted media content, and deliver the re-encrypted media content to the destination device.

13. The source device of claim 11 wherein when the media content is not associated with the rights management restriction, the control system is further adapted to deliver the media content via the non-compliant rights management media interface to the interconnect.

14. The source device of claim 11 wherein when the media content is associated with the rights management restriction and the destination device does not have a compliant rights management media interface, the control system is further adapted to reduce the quality of the media content to provide a reduced quality version of the media content, and deliver the reduced quality version of the media content via the non-compliant rights management media interface to the interconnect.

15. The source device of claim 11 wherein the first message is sent to the interconnect and the second message is received from the interconnect.

16. The source device of claim 11 wherein the control system is further adapted to retrieve the compliance encryption information via the first communication interface.

17. The source, device of claim 16 wherein the compliance encryption information is received from the interconnect.

18. The source device of claim 11 wherein the control system is further adapted to send the compliance encryption information for use by the interconnect via the first communication interface.

19. The source device of claim 18 wherein the compliance encryption information is sent to the interconnect.

20. The source device of claim of 11 wherein the non-compliant rights management media interface is at least one of a group consisting of a high-definition multimedia interface and a digital visual interface.

21. The source device of claim 11 wherein the rights management restriction is at least one restriction of a digital rights management protocol.

22. The source device of claim 21 wherein the digital rights management protocol is at least one of high-bandwidth digital content protection protocol and advanced access content system protocol.

23. A method for operating an interconnect that connects a source device to a destination device to facilitate delivery of media content that is associated with a rights management restriction, comprising:

receiving via a first communication interface that communicatively couples the interconnect to a communication interface of the source device first information indicating first media content to be delivered from the source device to the destination device is associated with the rights management restriction;

in response to receiving the first information from the source device indicating that the first media content to be delivered from the source device to the destination device is associated with the rights management restriction, determining whether a media interface of the destination device is compliant with the rights management restriction associated with the first media content; and if the media interface of the destination device is determined to be compliant with the rights management restriction associated with the first media content:

sending to the source device via the first communication interface second information indicating that the media interface of the destination device is compliant with the rights management restriction associated with the first media content; and in response to sending the second information to the source device:

receiving via a source media interface that provides a direct wired connection from the interconnect to a non-compliant rights management media interface of the source device encrypted media content, which is the first media content encrypted based on compliance encryption information;

decrypting the encrypted media content to provide unencrypted media content;

encrypting the unencrypted media content based on rights management encryption information associated with a compliant rights management media interface of the destination device to provide re-encrypted media content; and delivering the re-encrypted media content to the compliant rights management media interface of the destination device via a destination media interface of the interconnect that provides a direct wired connection from the interconnect to the compliant rights management media interface of the destination device.

24. A method of operating a source device to provide media content to a destination device via an interconnect comprising:

determining whether the media content to be delivered to the destination device is associated with a rights management restriction;

sending via a first communication interface that communicatively couples the source device to a communication interface of the interconnect a message indicating whether the media content is associated with the rights management restriction;

receiving from the interconnect via the first communication interface a second message indicating whether the destination device has a compliant rights management media interface; and when the media content is associated with the rights management restriction and the destination device has a compliant rights management media interface, effecting encryption of the media content based on compliance encryption information to generate encrypted media content for delivery via a non-compliant rights management interface of the source device to the interconnect.

25. The method of claim 24 wherein the interconnect is adapted to decrypt the encrypted media content to obtain decrypted media content, re-encrypt the decrypted media content based on rights management encryption information to provide re-encrypted media content, and deliver the re-encrypted media content to the destination device.

26. A non-transitory computer readable medium storing software comprising instructions for a control system of a source device to:
  determine whether media content to be delivered to a destination device is associated with a rights management restriction, the destination device being connected to the source device via an interconnect;
  send to the interconnect via a first communication interface of the source device that communicatively couples the source device to a communication interface of the interconnect a message indicating whether the media content is associated with the rights management restriction;
  receive from the interconnect via the first communication interface a second message indicating whether the destination device has a compliant rights management media interface; and
  when the media content is associated with a rights management restriction and the destination device has a compliant rights management media interface, effecting encryption of the media content based on compliance encryption information to generate encrypted media content for delivery via a non-compliant rights management interface of the source device to the interconnect.

* * * * *